Oct. 18, 1966      J. W. PISKORZ-NALECKI      3,279,408
SHIP FOR THE TRANSPORTATION OF LOOSE MASSES
Original Filed Oct. 16, 1963                    2 Sheets-Sheet 1

INVENTOR
Jerzy W. Piskorz-Nalecki
BY
Stevens, Davis, Miller & Mosher
ATTORNEYS

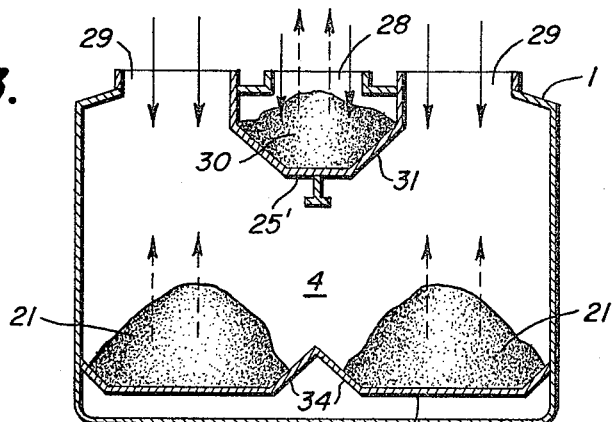
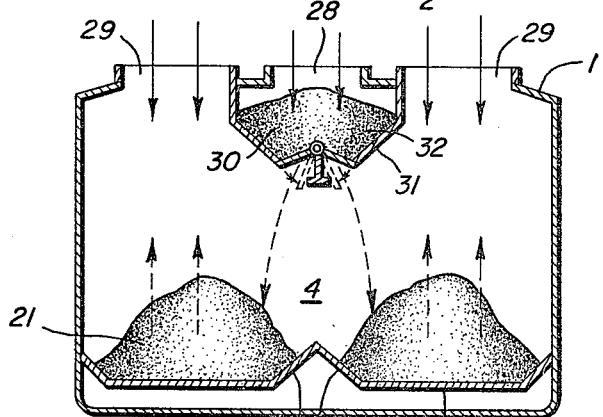
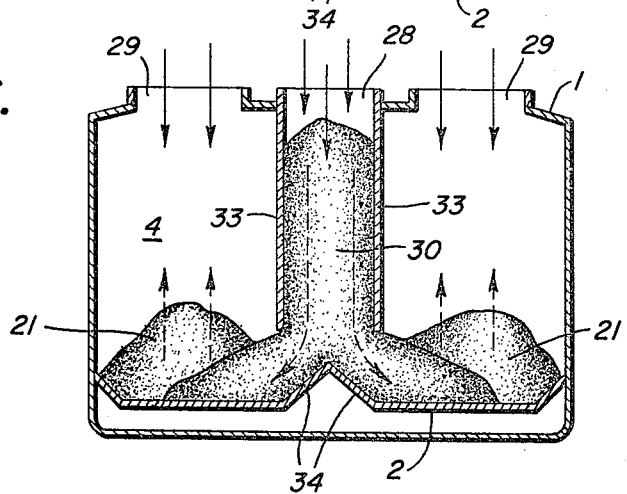

United States Patent Office 3,279,408
Patented Oct. 18, 1966

3,279,408
SHIP FOR THE TRANSPORTATION OF
LOOSE MASSES
Jerzy Wojciech Piskorz-Nalecki, Gdansk, Poland, assignor
to Centralny Osrodek Kontrukcyjno-Badawczy, Gdansk,
Poland
Original application Oct. 16, 1963, Ser. No. 316,621.
Divided and this application Apr. 21, 1965, Ser. No.
456,598
3 Claims. (Cl. 114—73)

The present application is a division of my application Serial No. 316,621 filed October 16, 1963. The present invention relates to a ship provided with longitudinally extending, self-unloading compartments used for the transportation of loose masses of material of different specific gravity.

Such ships permit the transportation of various types of bulk goods, such as iron and aluminum ore, phosphite, grain and the like, with full utilization of the ship's carrying capacity for each of these cargoes.

The capacity of the cargo holds of such ships is determined in such a way that they can contain the cargo of the desired cargoes which have the lowest specific gravity, i.e., the bulkiest cargo. In the case of cargoes of larger specific gravity, the cargo holds are only filled partly, and the cargo extends only up to a certain height above the bottom of the hold. The center of gravity of such a cargo naturally is lower than that of a cargo hold which is entirely filled.

A lowering of the center of gravity of the cargo results in an increase in the metacentric height of the ship and a reduction of the range of the ship's oscillations, or swinging or rolling movements. As is known, too small an amplitude of the ship's rolling movements is undesirable since rapid changes in the direction of motion of the ship produce dynamic forces which strain the ship and may cause injury to the ship's hull or fittings, and make the footing of people on the ship treacherous.

In order to reduce oscillations of the ship, it is necessary to keep the metacentric height small by providing the highest possible center of gravity of the cargo. In order to increase the height of the center of gravity of the cargo on ships which are presently in use and which are used for the transportation of loose masses, special cargo holds are provided high above the bottom of the customary or main hold, in which special holds a part of the freight is stowed. Such special holds are difficult to empty because they are small and operations with large and heavy grabs used for discharging a cargo of iron ore therefrom are very difficult to carry out.

One object of the present invention is to provide a ship for the transportation of loose masses of material, which ship is suitable for transporting goods of different specific gravity and is easy to unload, and has a hull of great longitudinal and transverse strength.

This object is achieved in accordance with the invention by the use of additional, self-discharging compartments installed lengthwise, or longitudinally of a ship. The use of such compartments makes it possible to raise the center of gravity of the ship's cargo, a part of which cargo is stowed high above the bottom of the main or usual cargo hold, while eliminating the disadvantageous discharge conditions of these additional compartments.

Referring to the drawings, they show more or less diagrammatically an embodiment of a ship in accordance with the invention.

FIGURE 3 is a cross, or athwart, section through the hold of the ship of FIGURES 1 and 2;

FIGURE 4 is a cross-section through the hold of another embodiment of the ship shown in FIGURES 1 and 2; and FIGURE 5 is a cross-section through the hold of still another embodiment of the ship shown in FIGURES 1 and 2.

In the figures, the solid-line arrows indicate the method of loading the holds of the ship and the dashed-line arrows the method of unloading the ship and its holds.

Figure 1:
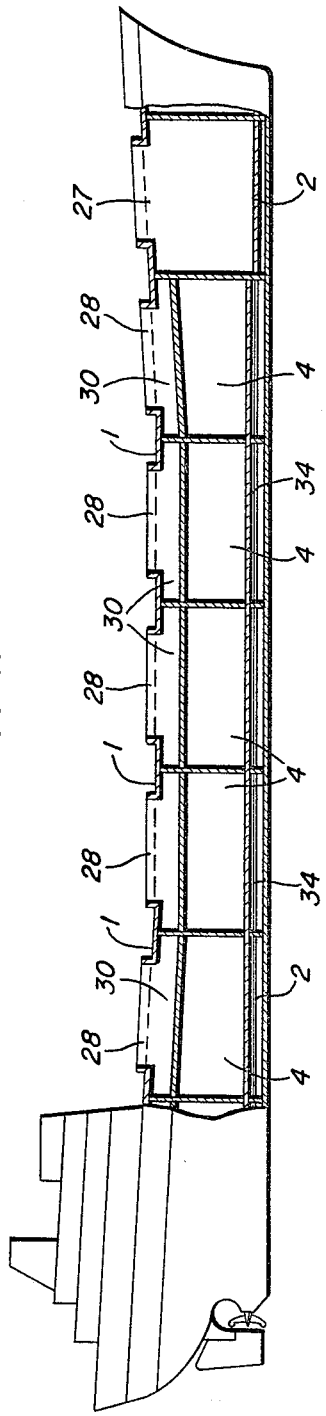
FIGURE 1 is a longitudinal side elevational view through a ship with lengthwise extending compartments.
Figure 2:
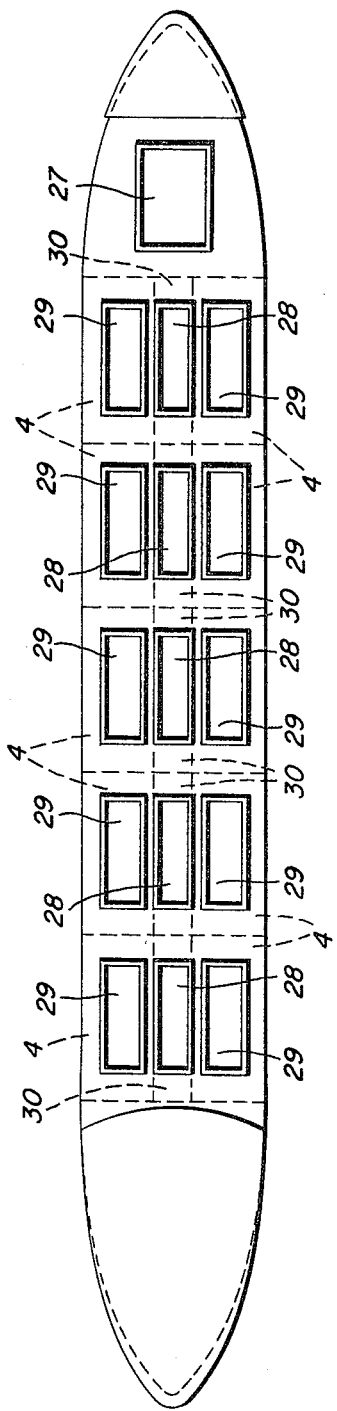
FIGURE 2 is a top plan view of the ship in FIGURE 1.

The lengthwise arrangement of the compartments shown in FIGURES 1 to 5 also have a number of novel features. The compartments 30 are formed by the lengthwise or fore and aft extending bulkheads 31 or 33 arranged below the deck 1 and extending parallel to the plane of symmetry of the ship.

The compartment 30 (FIGURE 3) can be closed off from below by the bottom 25 and is separated in this manner from the hold proper. The loading and discharging of such compartments is effected through the hatch 28.

In accordance with another embodiment of the compartment 30 (FIGURE 4), this compartment is provided at its bottom with a device, for instance with swingable flaps 32 which facilitate the unloading of the mass of material or cargo from the compartment 30 into the main cargo hold 4, together with the rest of the cargo 21 loaded therein through the hatch 29.

Another embodiment of the compartment shown in FIGURE 12 has a direct connection with the hold 4. The freight cargo 21 fills the compartment 30 from the double bottom 2 up to the deck 1. The center of gravity of this cargo will accordingly be higher than in the other part of the cargo which lies on the bottom 2 of the hold 4. In this way, the position of the center of gravity of the entire ship is shifted upward which results in a reduction in the rolling motions of the ship. The unloading of compartment 30 is effected automatically upon the emptying of the hold 4, even in case of one-sided unloading of the compartment 30. With the unloading of the cargo 21 out of the hold 4, the cargo contained in the compartment 30 slides under its own weight down along the walls of the bottom elevation 34, which is inclined on two sides, into the lateral portions of cargo hold 4, in which connection the downwardly inclined walls of the double-sided bottom elevation have a greater inclination than an ordinary angle of repose. From the lateral portions of hold 4 the cargo is discharged through the side hatches 29. The self-unloading compartments 30 are formed in the plane of symmetry of the ship by two fore and aft extending bulheads 33 which extend parallel to the ship's side walls or hull for the entire length of one or more holds 4. Bulkheads 33 extend downwardly from the deck 1 to a certain height above the ship's double bottom 2.

Separate hatches 28 lead to the compartments 30 or the compartments can have a common hatch for themselves and for the cargo holds 4 proper. When the bulkhead 31 or 33 passes continuously through all cargo holds 4 of the ship, the bulkheads can be considered a connection which reinforces the longitudinal strength of the ship. These bulkheads serve as natural grain bulkheads when the ship is transporting grain.

The hold bottom 34 is developed in the form of a ridge roof in the axis of symmetry of the ship, the tip of the roof pointing upward. The angle of inclination of the ridge-shaped elevation permits the automatic sliding of the cargo down from the compartment 30 into the hold 4. This elevation 34 extends as a continuous structure over the entire length of the ship, and can be taken into consideration in the calculations of the coefficient of the longitudinal strength of the ship.

The use of the ridge-shaped elevation permits the automatic sliding of the cargo down from the central part of the hold, which cannot be reached by the unloading apparatus, to the hatches 29.

What is claimed is:

1. In a ship for transporting a loose mass of cargo within a plurality of longitudinally extending double-bottomed cargo holds disposed on opposite sides of said ship and arranged in two rows with each hold having a longitudinally extending hatch opening, a means for raising the center of gravity of the cargo while lowering the metacentric height of the ship, said means comprising at least one longitudinally extending self-discharging compartment disposed adjacent the upper portion of each said hold, between said hatch openings extending lengthwise of said ship and attached to adjacent transverse bulkheads, said compartments being formed by longitudinally extending bulkheads which depend from a main deck, said compartment being closed off from below by a bottom which is spaced above the bottom of the cargo hold to allow communication between side-by-side holds, deflection means on the bottom of said cargo hold and positioned beneath said compartment, said deflection means comprising a pair of inclined surfaces arranged to direct the cargo towards the center of the cargo holds, the angle of inclination of said inclined surfaces being greater than the natural angle of repose of the cargo, means to discharge the cargo from said compartment to said cargo holds.

2. In a ship for transporting a loose mass of cargo and having a plurality of longitudinally extending double-bottom cargo holds arranged in two rows disposed on opposite sides of said ship, each hold having a longitudinally extending hatch opening, a means for raising the center of gravity of the cargo while lowering the metacentric height of the ship, said means comprising at least one longitudinally extending self-discharging compartment disposed between each said hold adjacent the upper portion thereof and lying between said hatch openings, said compartment extending between adjacent transverse bulkheads and comprising vertical sidewalls depending from a main deck and an inclined bottom directed towards the center of said compartment, said bottom being spaced above the bottom of said hold allowing free communication between said side-by-side holds, discharge means on the bottom of said compartment, cargo distributing means on the bottom of said cargo hold beneath said compartment, said distributing means comprising a pair of adjacent inclined surfaces, said inclined surfaces being directed towards the center of the cargo holds, the angle of inclination of the said sides being greater than the natural angle of repose of the cargo, means to discharge the cargo from said compartment bottom to the bottom of said cargo hold.

3. In a ship for transporting a loose mass of cargo and having a plurality of longitudinally extending double bottom cargo holds arranged with each hold having two rows of longitudinally extending hatch openings disposed on opposite sides of the longitudinal axis of the ship, a means for raising the center of gravity of the cargo while lowering the metacentric height of the ship, said means comprising at least one longitudinally extending self-discharging compartment disposed within each said hold adjacent the upper portion thereof and lying between said hatch openings, said compartment extending between adjacent transverse bulkheads and comprising vertical side walls depending from a main deck, an inclined bottom directed towards the center of said compartment, said compartment being spaced above the bottom of said hold allowing free communication between adjacent portions of said hold, discharge means on the bottom of said compartment, cargo distributing means on the bottom of said cargo hold beneath said compartment, said distributing means comprising a pair of adjacent inclined surfaces, said inclined surfaces being directed towards the center of the adjacent cargo holds, the angle of inclination of said sides being greater than the natural angle of repose of the cargo, means to discharge the cargo from the compartment bottom to the bottom of said cargo hold.

References Cited by the Examiner
UNITED STATES PATENTS 2,909,141  10/1959  Steffansson _____ 114—73

FOREIGN PATENTS 73,776  8/1960  France.
858,046  1/1961  Great Britain.

MILTON BUCHLER, *Primary Examiner.*

T. M. BLIX, *Assistant Examiner.*